United States Patent
Sonnenberg et al.

(10) Patent No.: US 6,830,262 B2
(45) Date of Patent: Dec. 14, 2004

(54) INFLATABLE AIRBAG DEPLOYMENT GUIDE

(75) Inventors: John Sonnenberg, Holly, MI (US); Dave Hoeft, Clawson, MI (US); Bob McGee, Davisburg, MI (US); Jim Sonnenberg, Royal Oak, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 10/193,608

(22) Filed: Jul. 11, 2002

(65) Prior Publication Data

US 2004/0007857 A1 Jan. 15, 2004

(51) Int. Cl.[7] .............................................. B60R 21/22
(52) U.S. Cl. ................................. 280/730.2; 280/729
(58) Field of Search ........................ 280/729, 730.1, 280/730.2, 743.1

(56) References Cited

U.S. PATENT DOCUMENTS 6,158,767 A * 12/2000 Sinnhuber ................ 280/730.2
6,338,498 B1 * 1/2002 Niederman et al. ....... 280/728.2
6,457,744 B1 * 10/2002 Tonooka ..................... 280/732
2003/0116947 A1 * 6/2003 Yokoyama et al. ...... 280/730.2
2003/0132620 A1 * 7/2003 Kawasaki et al. ....... 280/730.2

FOREIGN PATENT DOCUMENTS

| EP | 0904992 A2 | 3/1999 | ........... B60R/21/16 |
| JP | 11301400 | 11/1999 | ........... B60R/21/22 |
| JP | 200062562 | 2/2000 | ........... B60R/21/22 |
| JP | 2000071928 | 3/2000 | ........... B60R/21/22 |

* cited by examiner

*Primary Examiner*—Michael J. Carone
*Assistant Examiner*—Kimberly S. Smith
(74) *Attorney, Agent, or Firm*—Sally J. Brown

(57) ABSTRACT

The invention provides a self-contained, compact inflatable airbag deployment guide comprising an inflatable bladder attached to an inflatable airbag module. The inflatable bladder inflates early in the deployment of the airbag, thus filling, bridging, or covering void space located near the airbag cushion. The airbag cushion is then able to deploy properly on its intended route through the headliner trim of the vehicle without being delayed, damaged, or caught.

21 Claims, 7 Drawing Sheets

INFLATABLE AIRBAG DEPLOYMENT GUIDE

BACKGROUND OF THE INVENTION

1. Field of the Invention

The present invention relates to inflatable vehicular airbags. Specifically, the present invention relates to a deployment guide for use with inflatable vehicular airbags such as inflatable curtains.

2. Description of Related Art

In low-speed automobile collisions, occupants wearing safety belts are generally prevented from impact with objects located inside the vehicle such as the windshield, instrument panel, door, side windows, or steering wheel. In more severe collisions, however, even belted occupants may strike the interior of the car because their momentum is so great that they contact these objects before the seatbelts can fully decelerate them.

Conventional airbag systems were developed to supplement safety belts by deploying between an occupant and the interior surfaces of the vehicle. This reduces the chances of occupant contact with the vehicle's interior. A conventional airbag system typically consists of several parts, including: an airbag cushion, a sensor, and an inflator. The airbag is typically made of a thin nylon fabric, which is folded to fit into a steering wheel, dashboard, roof rail, interior panel, dashboard, or other space in a vehicle. The airbag system is tuned to use sensors in the vehicle to detect the sudden deceleration characteristic of an impact of a predetermined intensity. When the system detects an impact of sufficient severity it sends an electrical signal to the inflator. The inflator then produces an inflation gas for filling the airbag cushion. The inflation gas is then channeled into the airbag, inflating it. When an occupant of the vehicle contacts the airbag, the airbag absorbs the force of the occupant's impact. The inflation gas is then vented from openings in the airbag, eventually deflating it.

Airbags were first used in the front of a vehicle for an occupant's safety. More recently, vehicle manufacturers and suppliers developed side-impact airbag systems to better protect vehicle occupants during side-impact collisions. These airbag systems, which are commonly referred to as "inflatable curtains," are designed to inflate during an accident to cover the windows, doors, and lateral surfaces of the vehicle.

Inflatable curtain systems are often mounted within a housing located in the vehicle over the doors. Typically, this involves mounting the curtain along the edge of the roof of the vehicle behind interior trim such as a headliner, the A/B/C/D pillar trim, ATL's, sun visors, grab handles, coat hangers, and even weather seals. Care must be taken when designing such mounting schemes to assure that when an airbag is inflated it is able to properly displace the headliner and deploy around the interior trim of the vehicle and deploy within the vehicle to be positioned to protect vehicle occupants.

During the deployment of the airbag, the inflating cushion expands by first moving into areas that provide the least resistance with the interior vehicle trim. When the internal pressure of the inflating airbag becomes sufficient to displace the interior trim, the airbag rapidly moves into the cabin of the vehicle and becomes fully inflated.

Several difficulties have been encountered in assuring that inflatable curtain airbags are properly deployed during a collision. First, in many vehicles there is a void space located behind the trim near the installed airbag. Such voids are often present at the top of the structural pillars or trim of the vehicle. Of specific note are the void spaces located at the tops of pillars such as the B, C, and D pillars. During airbag deployment, the expanding airbag sometimes fills these void spaces. When this happens, as the headliner gives way, those regions of the airbag cushion that have penetrated into the void spaces may be delayed in their deployment into the cabin. Indeed, the airbag as a whole or in part may become caught in the trim and thus be prevented from properly deploying. Lastly, the caught or misdirected airbag may continue to expand and eventually detach the trim from the vehicle, possibly sending it into the passenger compartment.

Additionally, in many vehicles, the pillar areas have a diverging flange to blend the shape of the pillar into the headliner surface to provide a more visually-pleasing appearance. An overlap space of at least 10 mm of the pillar over the headliner is often provided to assure that no gap will appear between them as a result of normal build variances. This overlap provides a further obstacle to the proper deployment of the airbag cushion.

These deployment problems have been addressed by adding deployment "ramps" or "guides" to direct a deploying airbag over void spaces and toward the headliner. Such deployment ramps are generally made of a solid material. The ramps are often up to 1–1½ inches thick to provide sufficient resistance to direct the airbag to properly deploy through the headliner. Because of their size and shape, these ramps may complicate the airbag installation process. Additionally, the ramps add expense to the cost of airbag systems in vehicles and take up space behind the trim.

Accordingly, it would be an advancement in the art to provide an inflatable airbag deployment guide that is integrated into the inflatable curtain module. Additionally, it would be beneficial to provide a guide that is placed for use only when it is needed, such as during the deployment of the airbag. Further, it would be an advancement in the art to provide a deployment guide that takes up little space during storage, and adds little weight and expense to the inflatable curtain system. Such an airbag deployment guide is disclosed herein.

SUMMARY OF THE INVENTION

The apparatus of the present invention has been developed in response to the present state of the art, and in particular, in response to the problems and needs in the art that have not yet been fully solved by currently available airbag deployment guides.

The invention provides a self-contained, compact, and inexpensive guide for the deployment of inflatable curtain airbag cushions. Specifically, the invention includes an inflatable guide for directing an airbag cushion over obstacles such as void spaces to assure proper deployment of the airbag. The inflatable deployment guide may be incorporated into airbags and airbag modules. The invention also includes methods of deploying an airbag cushion using such an inflatable guide.

The inflatable airbag deployment guide of the invention has an inflatable bladder that is typically attached to the outside (or vehicular window side) of an airbag cushion by an inflation inlet. The inflation inlet may be connected to an early-filling portion of the cushion. The bladder and inlet may be integrated into the weave design of the cushion, or they may each be cut and assembled separately. The inflatable bladder may also be included in an airbag module. As such, the inflatable bladder may be attached to the airbag, or may be attached directly to the inflator or to the inflator housing of the module instead of to the airbag.

As briefly noted, the airbag deployment guide also includes an inflation inlet. The inflation inlet allows inflation gas to pass from the airbag cushion or filling tube attached to the inflation device into the bladder of the inflatable airbag deployment guide. To do this, the inflation inlet may be coupled on a first end to an airbag cushion and on a second end to the inflatable bladder.

Generally, the uninflated bladder of the inflatable guide occupies little space, and can thus be housed inside the cover system of an existing airbag module. The guide may be configured such that when the airbag module is properly installed in a vehicle, it is positioned near the void space in the trim. This places the guide in position for proper deployment during a collision event.

Upon deployment of the inflatable curtain, a portion of the gas moving into the airbag cushion is channeled into the inflatable bladder. This may be accomplished either by making the inflation inlet of the inflatable bladder continuous with the interior of the airbag cushion or by directly attaching the inflation inlet to an opening of the inflator or inflator housing. In either case, the bladder is rapidly filled by the gas from the inflator.

The bladder prevents entry of the airbag cushion into voids in the trim. To do this the bladder may be sized to take up all of the available space in the void area in the trim. The bladder would thus prevent penetration of the airbag cushion into the void space by occupying the space and providing resistance to the expanding cushion. Alternatively, the bladder may be sized to inflate sufficiently to merely cover over the void space. In this way, the bladder blocks the airbag cushion from accessing the void space during the deployment of the airbag. In still other alternatives, the inflatable bladder is sized to inflate and simply bridge over at least a portion of the void space.

In use, the inflatable bladder deploys into or across the void space while the airbag cushion continues to fill. As the airbag cushion begins to inflate and push down out of its stored location, the filled inflatable bladder resists the force exerted upon it by the inflating airbag cushion. This prevents the airbag cushion from "seeing" any void in the trim void space as a path of least resistance. The airbag cushion thus inflates until it escapes through the headliner over the trim edge and out into the vehicle cabin.

The bladder is configured to inflate either before the airbag cushion or very early in the inflation of the airbag cushion. Due to the shape and size of the bladder, as well as its proximity to an inflator, the inflatable bladder inflates rapidly. The inflatable bladder is configured to inflate, hold pressure to assure proper deployment of the airbag, and then remain inflated for the same time period as the rest of the cushion. The inflatable bladder then deflates with the rest of the module.

The invention also includes methods of guiding the deployment of any airbag cushion by placing an inflatable structure in the path of the airbag cushion. Such methods may include the steps of inflating an inflatable bladder in a void located near an airbag cushion and inflating the airbag cushion. When inflated, the airbag deployment guide promotes proper inflation of the airbag cushion. In these methods, the bladder and the airbag cushion may be inflated at substantially the same time, or the bladder may be inflated before the airbag cushion.

These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, systems, and methods of the present invention, as represented in FIGS. 1A through 5 is not intended to limit the scope of the invention as claimed, but is merely representative of presently preferred embodiments of the invention.

Figure 1A:
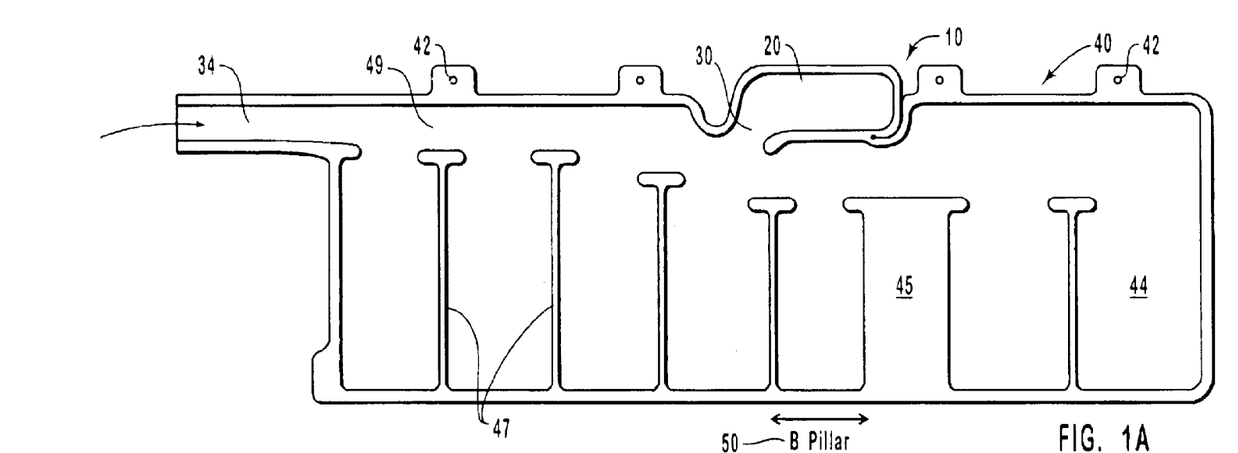
FIG. 1A is a cross-sectional view of an airbag of the invention having an inflatable deployment guide positioned at the B-pillar.

Referring to the drawings, FIGS. 1A–1F show cross-sectional views of various embodiments of the inflatable airbag guide of the invention. FIG. 1A shows a first embodiment of the inflatable airbag deployment guide 10 incorporated into an inflatable curtain airbag cushion 40. The inflatable airbag deployment guide 10 has an inflatable bladder 20 attached to the cushion 40 by an inflation inlet 30. The inflation inlet 30 joins the bladder 20 to the airbag cushion 40 along an upper region of the cushion. This upper region of the cushion is designated the fill chamber 49. The guide 10 is placed to deploy into the region above the B-pillar 50 of a vehicle, which may include void space between the top of the trim and the metal pillar. The curtain cushion 40 is shown to include a number of compartments 44, separated by dividers 47. The cushion 40 may also include an uninflated zone 45. The illustrated airbag configuration is simply illustrative and other configurations may, of course, be used in connection with the present invention.

Attachment of the inflatable bladder 20 to the fill chamber 49 of the curtain 40 allows the bladder 20 to be inflated in conjunction with (at the same time as) the fill chamber 49 prior to the inflation of the airbag 40. This helps to assure that the inflatable bladder 20 deploys properly before the airbag 40 has expanded significantly into void spaces. Early-inflating regions of the airbag cushion 40 suitable for bladder 20 attachment include areas close to airbag inflation inlets 30, the fill chamber 49, and regions in the primary flow path of the gas emitted by the inflator. This early deployment, made possible by proper placement and by the relatively small size of the inflatable bladder 20, places the inflatable bladder 20 in position prior to the deployment of the airbag cushion 40. This helps to assure that the airbag cushion 40 is properly guided away from void spaces. The cushion 40 may be attached to a vehicle using attachment points 42.

The inflation inlet 30 of the deployment guide 10 may be a connecting region of the bladder 20, or it may be a separate component attached to the bladder 20 and the airbag cushion 40. The inflation inlet 30 may attach the bladder 20 to the airbag 40 for an inflation gas supply. It may alternatively attach the bladder 20 directly to the inflator (not shown) or the inflator housing (not shown) for a supply of inflation gas. Finally, in some possible configurations, the bladder 20 may be equipped with an inlet 30 and an outlet (not shown) to allow flow of the inflation gas through the bladder 20.

Figure 1B:
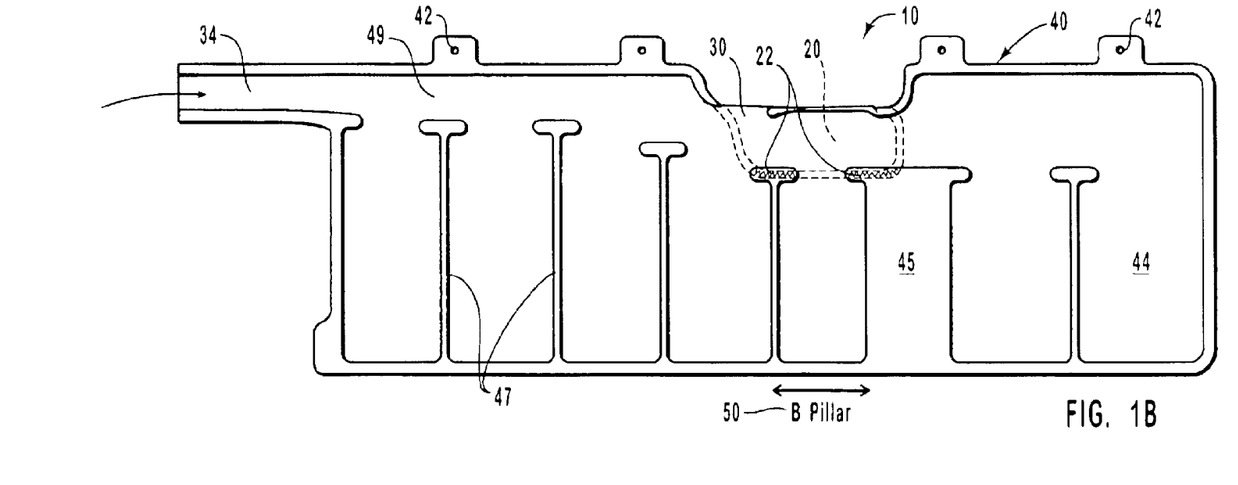
FIG. 1B is a cross-sectional view of an airbag showing the deployment guide of FIG. 1A folded into position and stitched for deployment.

FIG. 1B shows the relationship of the inflatable bladder 20 to the airbag cushion 40 when in its folded and deployed configuration. Specifically, when deployed, the inflatable bladder 20 becomes folded over relative to the airbag cushion 40. The figure shows the folding that takes place when the void space to be filled by the airbag is located beneath the installed airbag 40. Other folding may occur when the airbag 40 is positioned differently relative to a void space. In some embodiments of the inflatable airbag deployment guide 10, such positioning of the deployed inflatable bladder 20 may be assured by folding the inflatable bladder 20 into the proper position for storage. The inflatable bladder 20 may also first be folded over and then also attached to the cushion 40 with attachments 22 to further assure proper deployment.

The inflatable deployment guide 10 of the invention is constructed using methods generally known in the art of designing and constructing vehicular airbags. As a result, the bladder 20 may be attached to the airbag cushion 40 by methods including sewing, gluing, or heat-welding. In such airbags 40, the bladder 20 and inflation inlet 30 may be constructed out of materials similar to those used in the airbag 40, and even from pieces of material left-over from the assembly process of the airbag 40. This could include material cut from the uninflated zone 45 of the cushion 40.

In addition, the bladder 20 may be incorporated into the weave design of the airbag 40, thus rendering it and the inflation inlet 30 integral parts of the cushion 40. This simplifies the construction process, thus possibly reducing cost.

Following the attachment of the bladder 20 to the airbag 40 using any of the methods known in the art, the deployment guide 10 may be folded for use. The bladder 20 may be folded over against an outside (or window-facing) face of the airbag cushion 40 to make the airbag 40 useful as a driver's side or passenger's side airbag. This assures proper positioning of the deployment guide 10. This folding may be made permanent by attaching the deployment guide 10 to the intended face of the airbag 40. These attachments 22 maybe made using methods such as tack-stitching, heat-welding, stapling, or gluing.

Figure 1C:
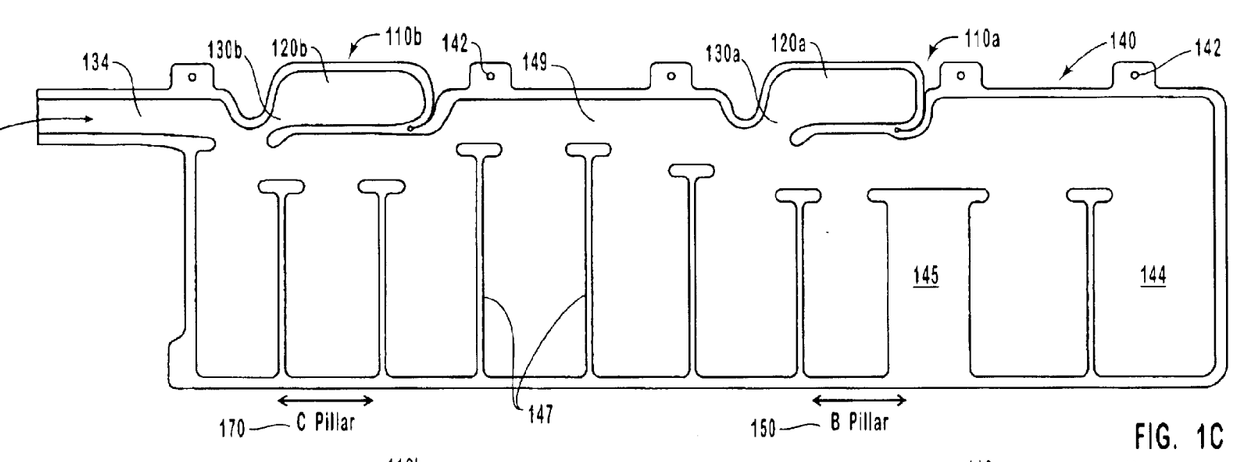
FIG. 1C is a cross-sectional view of an airbag having multiple deployment guides according to the invention.
Figure 1D:
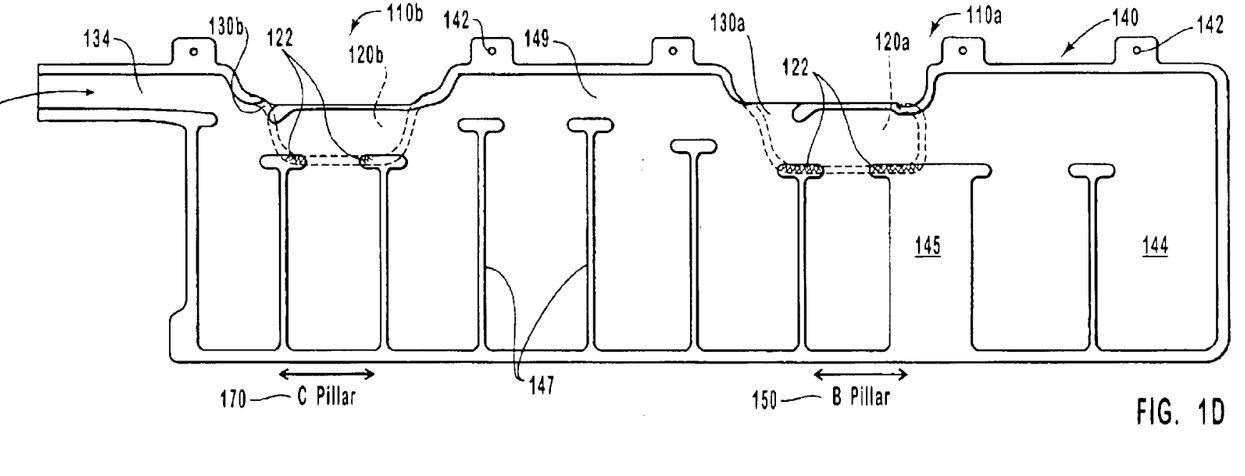
FIG. 1D is a cross-sectional view of an airbag showing the deployment guides in their deployed positions.

FIG. 1C shows an alternative airbag cushion 140, here an inflatable curtain, incorporating two inflatable airbag deployment guides 110a, 110b of the invention. Here, the airbag cushion 140 incorporates a first inflatable bladder 120a and a second inflatable bladder 120b. The first and second inflatable bladders 120a, 120b are similar to the inflatable bladder 20 of the embodiment described above, each having an inflation inlet 130a, 130b. This airbag cushion 140 provides deployment guides 110a, 110b in two locations, and is thus suitable for use in a vehicle with multiple void spaces along the deployment path of the airbag cushion 140. This embodiment shows placement of the guides 110a, 110b above a B-pillar 150 and the C-pillar 170. Additional guides such as 110a, 110b may be placed along longer curtains used with additional void spaces to assure proper deployment. Here again the guides 110a, 110b are joined to the airbag cushion along a fill chamber 149 and an inflation inlet 134. The curtain, similar to that described above, includes compartments 144, separated by dividers 147, and having an uninflated zone 145. FIG. 1D shows the cushion 140 of FIG. 1C with the deployment guides 110a, 110b folded over and attached to the body of the airbag cushion 140 by attachments 122 to position them properly for deployment. The cushion 140 may be attached to a vehicle using attachment points 142.

Figure 1E:
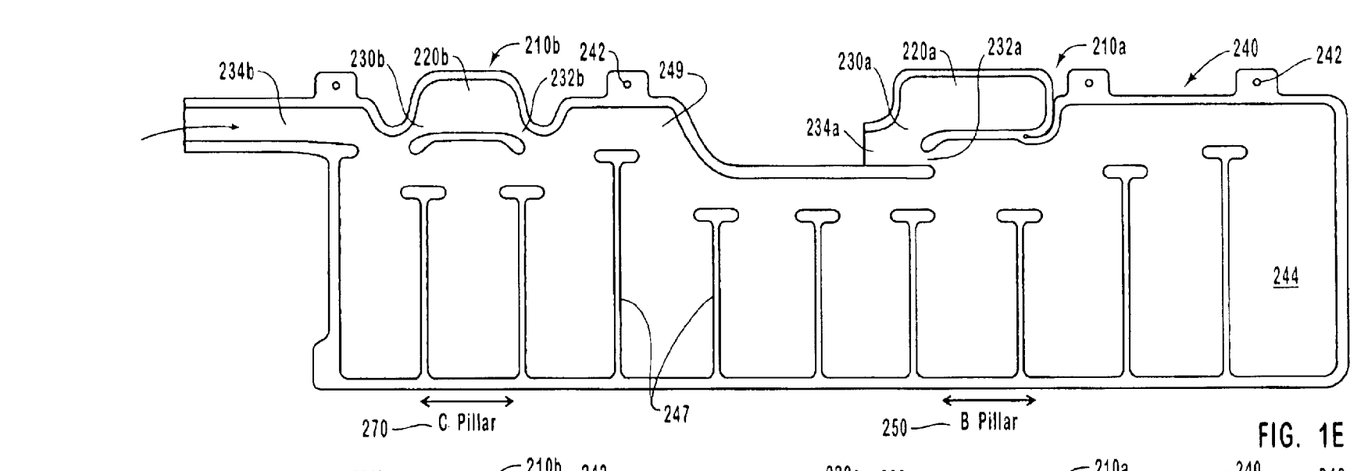
FIG. 1E is a cross-sectional view of an airbag having multiple deployment guides.

FIG. 1E shows yet another airbag cushion 240 having other embodiments of the inflatable airbag deployment guide 210 of the invention. This figure shows an airbag cushion 240 having multiple inflatable deployment guides 210a, 210b. In this cushion 240, the guides 210a, 210b comprise additional embodiments of the invention. Multiple guides providing an airbag cushion 240 with multiple inflatable bladders, 220a, 220b may be incorporated into an airbag cushion such as an inflatable curtain 240 with a large deployment area extending over several void spaces. In FIG. 1E, the airbag cushion 240 has a first inflatable airbag deployment guide 210a and a second inflatable airbag deployment guide 210b.

This airbag cushion is adapted for use in vehicles requiring large airbag cushions such as 240 which require multiple airbag inflators (not shown) for proper protection of vehicle occupants. The first inflatable airbag deployment guide 210a comprises an inflatable bladder 220a and an inflation inlet 230a, placed in a region corresponding to the location of the B-pillar 250, which also serves as a first airbag inlet 234a. In this deployment guide, initiation of an inflator (not shown) attached to the inflatable bladder 220a by the inlet 230a provides inflation of the guide 210a immediately prior to the inflation of the airbag cushion 240. Inflation gas produced by the inflator is channeled to the airbag cushion 240 through an airbag outlet 232a.

Figure 1F:
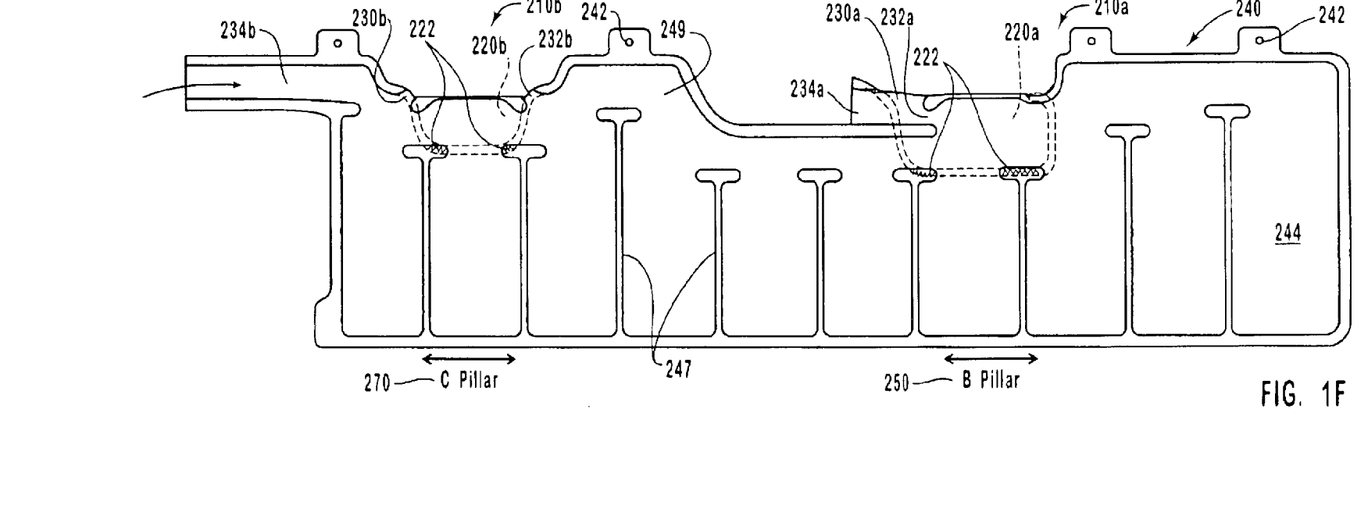
FIG. 1F is a cross-sectional view of an airbag showing the inflatable deployment guides in their deployed positions.

The cushion 240 further includes a second inflatable airbag deployment guide 210b which is positioned behind the first guide 210a in a region corresponding to the location of the C-pillar 270. Guide 210b is inflated by inflation gas channeled from the airbag inlet 234b through the fill chamber 249 located in an upper region of the cushion 240. This guide 210b includes an inflatable bladder 220b and an inflation inlet 230b. The inflatable bladder 220b further includes a bladder outlet 232b through which inflation gases may pass to the airbag cushion 240, filling compartments 244, which are separated from each other by dividers 247. FIG. 1F shows the cushion of FIG. 1E with the inflatable bladders 220a, 220b folded down into position for proper deployment and attached to the cushion 240 by attachments 222. The cushion may comprise attachment points 242.

Figure 2:
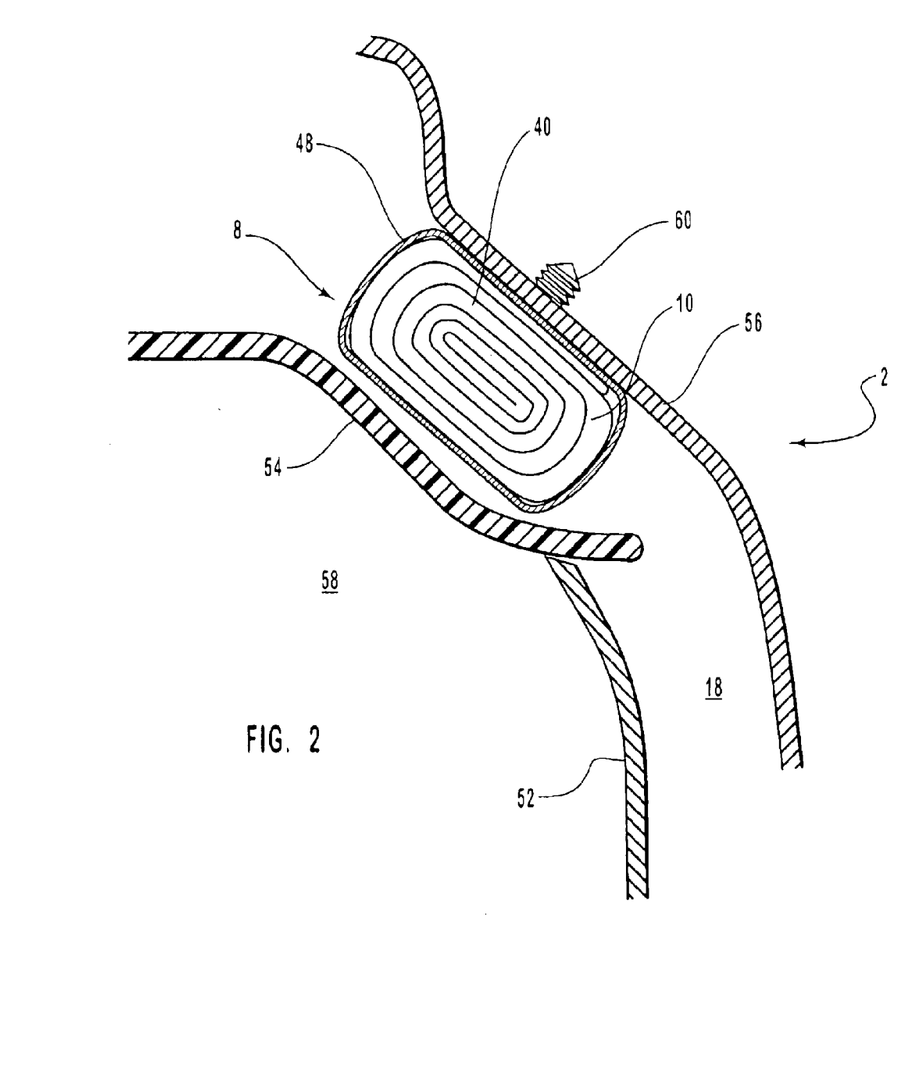
FIG. 2 is a cross-sectional view of an airbag including the inflatable deployment guide of the invention installed in a vehicle, the airbag being shown in its stowed configuration.

FIG. 2 is a cross-sectional view of the vehicular airbag 40 of FIGS. 1A, 1B, shown installed in a vehicle 2 in its stowed configuration. This figure shows an airbag module 8 including having a deployment guide 10 mounted to the roof rail 56 of the vehicle 2 by an airbag mount 60. The airbag cushion 40 is shown enclosed in a module cover 48. The airbag module is shown to be enclosed in a space defined by the roof rail 56, a headliner 54 separating the module from the passenger compartment 58, and the B-pillar trim 52. In this configuration, a void space 18 is located below the airbag module 8 in the path of the inflation of the airbag cushion 40.

When in a folded, or stowed, configuration such as is shown in FIG. 2, the inflatable airbag guide 10 is generally small enough to be used with current airbag housings. Specifically, the airbag guide 10 adds little bulk to the folded airbag cushion 40, and requires a minimal amount of inflation gas. This allows it to be added to an existing airbag design without necessitating changes to the airbag's housing, mounting, or deployment equipment. This helps to reduce the cost impact of the addition of the inflation guide. The inflatable airbag guide 10 may be folded or rolled in a variety of ways to place it in its stowed configuration.

Figure 3:
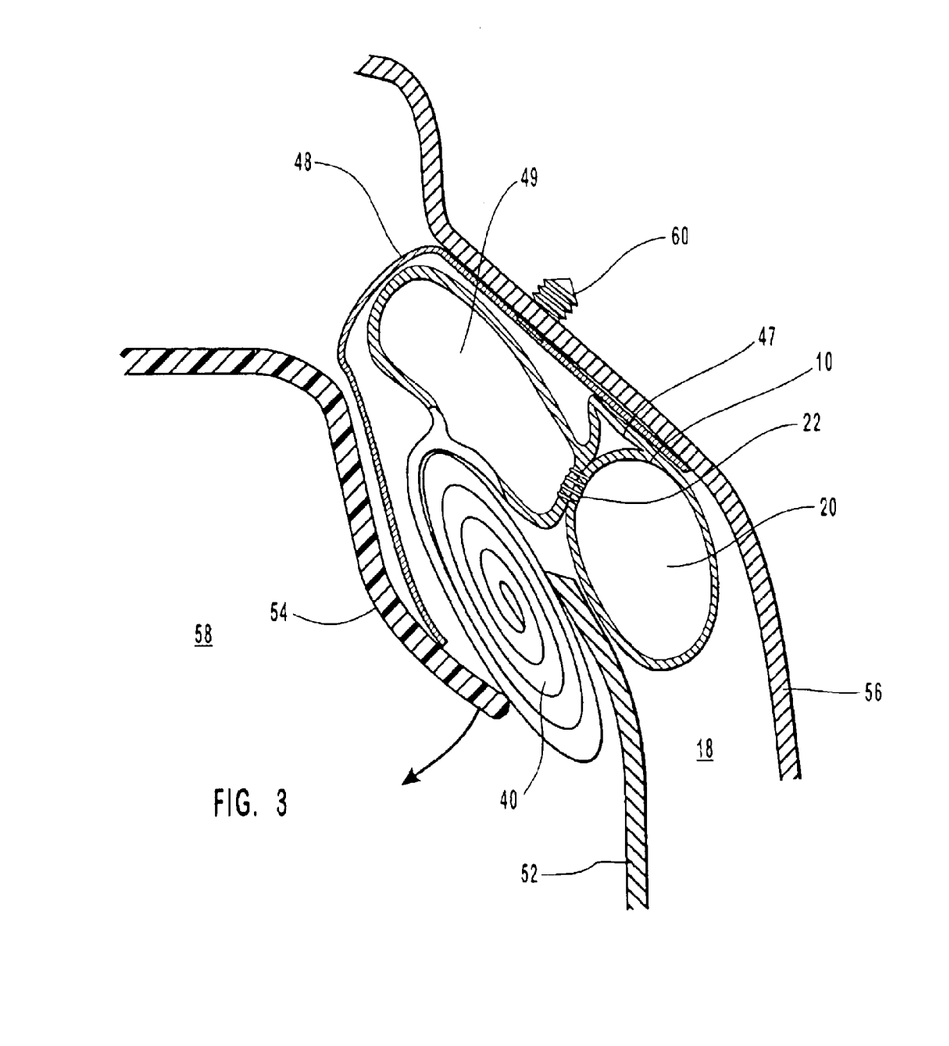
FIG. 3 is a cross-sectional view of an airbag including the inflatable deployment guide of the invention installed in a vehicle, the airbag being shown partially deployed.

FIG. 3 shows a similar side cutaway view of the mounted vehicular airbag 40 of FIG. 3, here shown with the airbag 40 partially deployed and the deployment guide 10 fully inflated. As the airbag cushion 40 begins to inflate, it forces cover 48 open and begins to drop through the joint between the headliner 54 and the B-pillar trim 52 into position within the passenger compartment 58. Early in this process, the deployment guide 10 deploys as the inflatable bladder 20 inflates using gas from an airbag inflator that has been channeled along an upper portion of the airbag cushion 40 which forms a fill chamber 49. The inflatable bladder 20 is positioned so as to block void space 18 by closing off access to it, filling it at least in part, or bridging over it at least in part. Proper positioning may be aided by folding the bladder 20 along the divider 47 which separates the bladder 20 from the airbag cushion 40. This may be additionally reinforced by attaching the bladder 20 to the airbag cushion 40 in this folded-over configuration by an attachment 22. Such an attachment 22 may take the form of stitches, welds, staples, adhesive, or other suitable methods or materials.

The inflatable bladder 20 is positioned and inflated between the roof rail 56, and the trim of the B-pillar 52. In this way, the bladder 20 "blocks" the void space 18 by covering it completely or in part. In some embodiments of the guide 10, the bladder 20 will be configured to block the void by filling up space within the void 18 sufficient to significantly block entry of the airbag cushion 40 into the void 18. Others will block the void 18 by using a bladder 20 configured to significantly cover over any access to the void space 18. Yet other embodiments guide the inflating airbag cushion 40 away from the void space 18 by providing inflatable bladders 20 which act as guides over portions of the void space 18 to act as bridges guiding the airbag cushion 40 across it.

Figure 4:
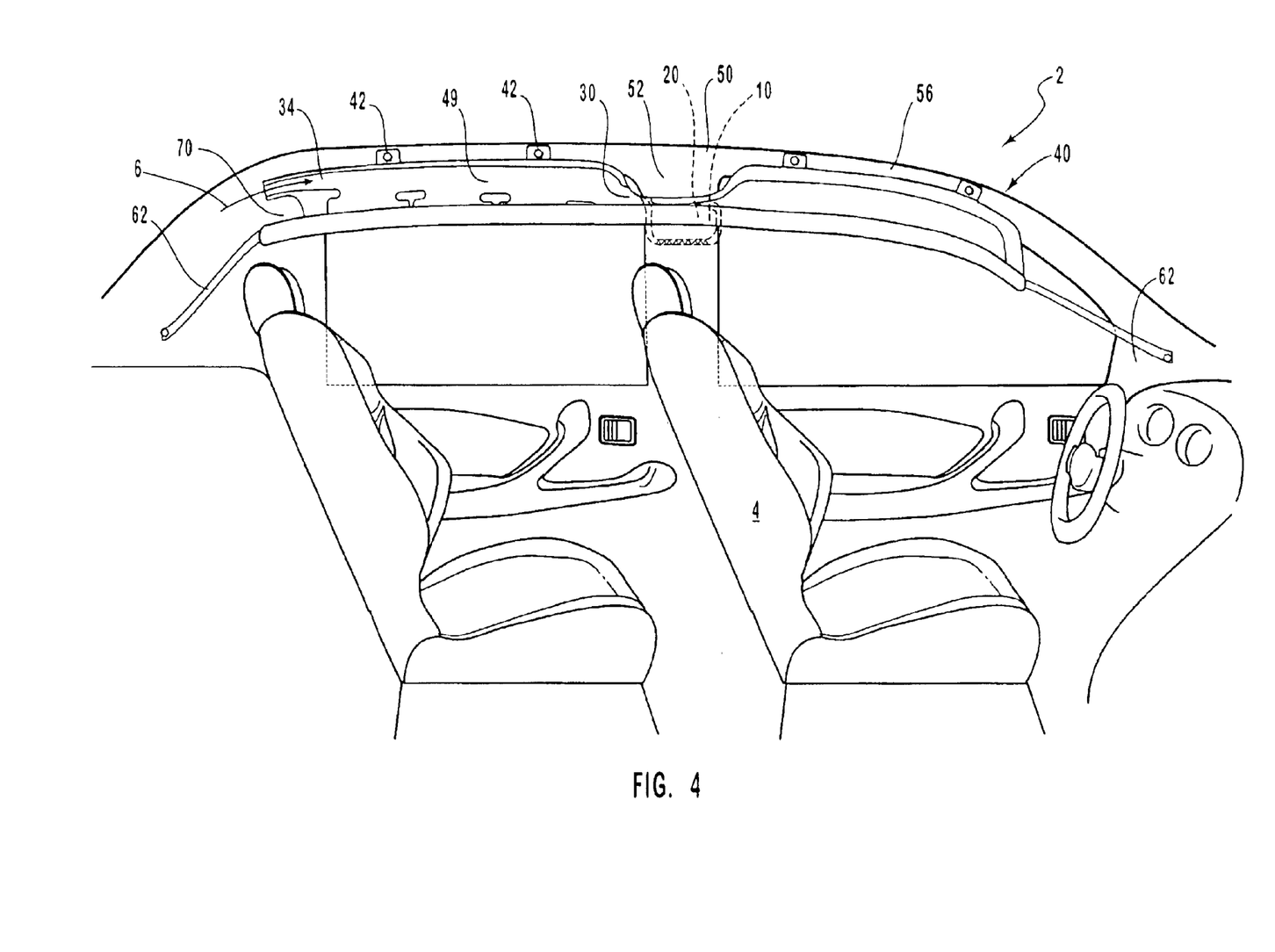
FIG. 4 is a perspective view of the inside of a vehicle including the partially-deployed airbag of FIG. 3.

FIG. 4 shows a perspective view of the guide of FIG. 1A, 1B (in phantom) deployed and positioned and an airbag cushion 40 partially inflated. This figure shows the function and positioning of the guide 10 of the invention during the deployment of the airbag 40. This figure shows the deployment guide 10 mounted above the B-pillar 50 in use with an inflatable curtain airbag 40 to protect a vehicle occupant (not shown) situated in seat 4. This is only one of the potential mounting locations for the guide 10. Here, the guide 10, shown in phantom, includes an inflatable bladder 20 and an inflation inlet 30. This guide 10 receives inflation gas 6 indirectly from an airbag inflator (not shown) through the attachment of the inflation inlet 30 of the guide 10 to the airbag cushion 40 such that the interior of the airbag cushion 40 is continuous with the interior of the inflatable bladder 20. This allows inflation gas to flow freely from an inflator through the airbag cushion 40 and the inflation inlet 30 into the inflatable bladder 20. The bladder 20 is shown here to be folded and positioned to properly block a void space in the B-pillar 50. This proper positioning is assured by attachments 22, which may include stitches, welds, and/or glued joints.

The airbag cushion 40 may be attached to the roof rail 56 of a vehicle 2 by attachment points 42 located across a top edge of the airbag cushion 40. The cushion 40 further comprises compartments 44 which inflate, and which are partially separated from each other by dividers 47. The airbag cushion 40 further includes a so-called "uninflated zone" 45 which is preferably placed adjacent to the headrest of the front seat 4 of the vehicle 2. The cushion 40 is inflated by an airbag inflator (not shown) attached to an airbag inlet 34 which transmits inflation gas 6 into the cushion 40 through the fill chamber 49. The airbag 40 may also include tethers 62. In this airbag embodying the guide 10 of the invention, the airbag does not overlap C-pillar 70, thus obviating the need for a guide 10 at that pillar.

Figure 5:
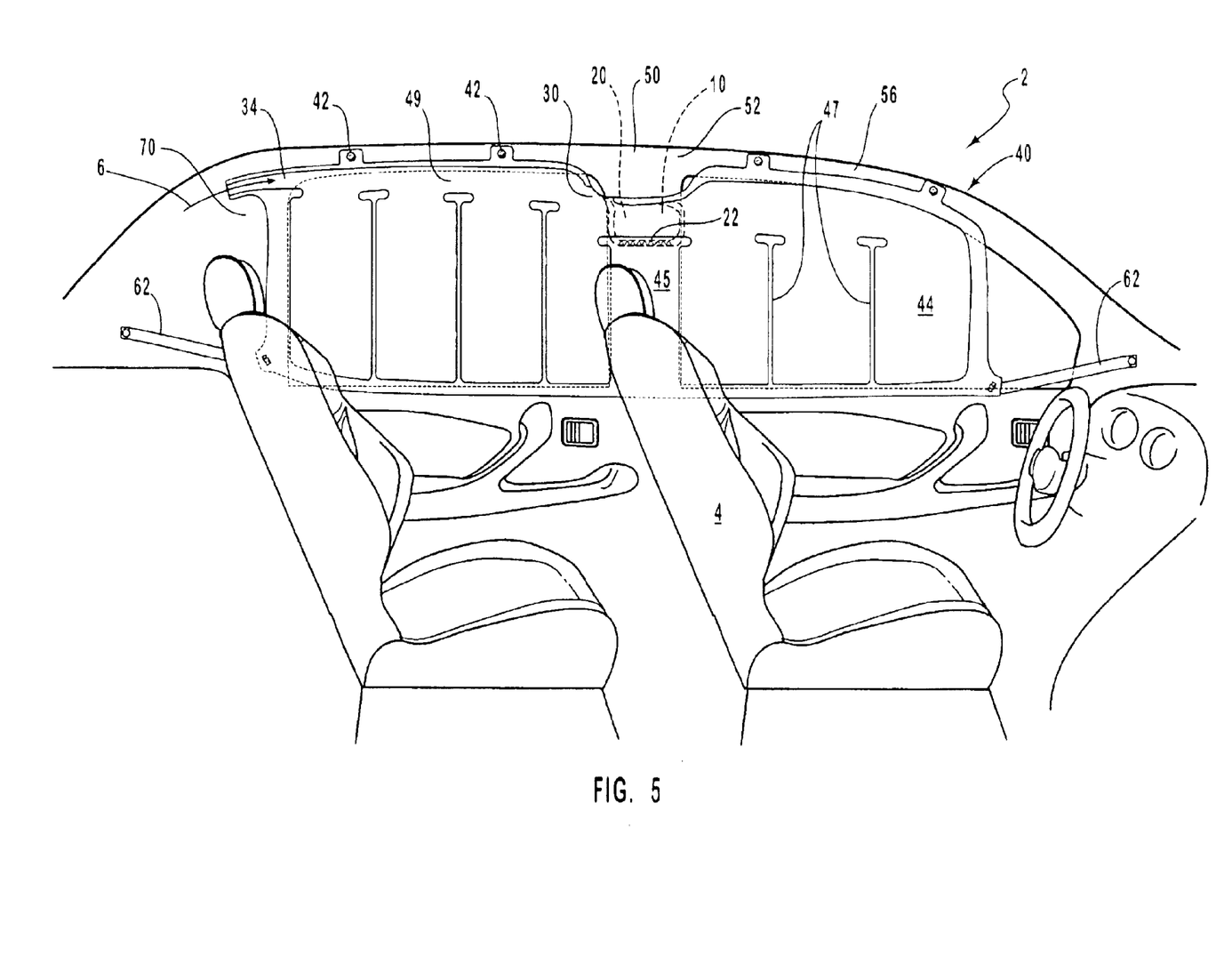
FIG. 5 is a perspective view of the inside of a vehicle including a fully-inflated, inflatable curtain airbag incorporating the airbag of the invention.

FIG. 5 shows a perspective view of the interior of a vehicle including the inflatable airbag deployment guide 10 of FIG. 4. In FIG. 5, the deployment guide 10 is shown mounted and deployed in a vehicle 2 with a fully-deployed airbag cushion 40, here an inflatable curtain airbag. The deployment guide 10 is inflated behind and/or above the B-pillar trim 52. The deployment guide 10 inflated to prevent the cushion 40 from entering void space within the B-pillar 50. As a result, the airbag cushion 40 deployed properly into the vehicle 2 to provide protection. Proper airbag deployment is critical to assure the proper protection of vehicle occupants.

Thus, the invention discloses an inflatable airbag deployment guide. The guide first comprises an inflatable bladder. This bladder blocks access to the void by filling, covering, or bridging a void space near the folded airbag cushion during deployment of the airbag cushion. This helps to prevent malfunctions of the airbag such as incomplete or improper deployment. Such malfunctions may be caused when the airbag, following the path of least resistance during deployment, enters a void space in the trim of the vehicle and becomes lodged there as the cushion inflates.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. An airbag deployment guide for use with an airbag cushion, the airbag deployment guide comprising:
   an inflatable bladder having an inflation inlet positioned on an airbag cushion such that the inflatable bladder is in direct fluid communication with the fill chamber of the airbag cushion, and such that the inflatable bladder is inflated by inflation gas received from the fill chamber of the airbag cushion;
   wherein when installed in a vehicle, the bladder is positioned to deploy outboard with respect to the airbag cushion to block a void located in proximity to the airbag cushion, thus guiding the airbag cushion past the void.

2. The airbag deployment guide of claim 1, wherein the inflatable bladder of the airbag deployment guide is woven into an airbag cushion.

3. The airbag deployment guide of claim 1, wherein the inflatable bladder of the airbag deployment guide is attached to the airbag cushion.

4. An inflatable airbag comprising:
   an airbag cushion; and
   an airbag deployment guide having an inflatable bladder and an inflation inlet, wherein when the airbag deployment guide is installed in a vehicle near a void space behind an interior trim covering one of a B pillar of the vehicle and a C pillar of the vehicle and the airbag cushion is attached to a source of inflation gas, wherein the bladder is attached to the airbag cushion such that it is in direct fluid communication with the fill chamber of the airbag cushion, and such that the inflatable bladder receives inflation gas from the fill chamber of the airbag cushion to inflate into the void space to promote proper deployment of the inflatable airbag.

5. The inflatable airbag of claim 4, wherein the airbag cushion is an inflatable curtain.

6. The inflatable airbag of claim 4, wherein the inflatable bladder is woven into the inflatable airbag.

7. The inflatable airbag of claim 4, wherein the inflatable bladder is attached to the inflatable airbag by a method selected from a group of sewing, welding, and gluing.

8. An airbag module with an inflatable airbag deployment guide comprising:
   an airbag cushion;
   an inflatable airbag deployment guide having an inflatable bladder and an inflation inlets, the inlet being positioned on the airbag cushion such that the inflatable bladder is in direct fluid communication with the fill chamber of the airbag cushion, and such that the inflatable bladder receives inflation gas from the fill chamber of the airbag cushion; and
   an inflator for providing inflation gas to the airbag cushion and the inflatable airbag deployment guide;
   wherein the inflator inflates the airbag cushion, which transmits inflation gas to the inflatable bladder through the inflation inlet such that the inflatable bladder inflates into a void, wherein the airbag cushion abuts the inflatable bladder during inflation of the airbag cushion so that the inflatable bladder directs the airbag cushion to inflate outside the void.

9. The airbag module of claim 8, wherein the inflatable bladder of the inflatable airbag deployment guide is woven into the airbag cushion.

10. The airbag module of claim 8, wherein the inflatable bladder of the inflatable airbag deployment guide is attached to the airbag cushion.

11. An inflatable airbag comprising:
    an airbag cushion; and
    an inflatable airbag deployment guide coupled to the airbag cushion by an inflation inlet positioned on the airbag cushion such that the inflatable bladder is in direct fluid communication with the fill chamber of the airbag cushion and receives inflation gas from the fill chamber of the airbag cushion; wherein the inflatable airbag deployment guide is sized and configured to deploy in a position that controls an inflation path of the airbag cushion without permitting contact between the inflatable airbag deployment guide and a vehicle occupant during a collision event.

12. The inflatable airbag of claim 11, wherein the airbag cushion is configured to be an inflatable curtain.

13. A method of guiding the deployment of an airbag cushion comprising the steps of:
    providing an airbag cushion including an inflatable bladder, the bladder being in direct fluid communication with a fill chamber of the airbag cushion and receiving inflation gas from the airbag cushion;
    inflating an inflatable bladder outboard, into a void located near an airbag cushion to bridge the void; and
    inflating the airbag cushion to abut the inflatable bladder such that the inflatable bladder promotes proper inflation of the airbag cushion.

14. The method of claim 13, wherein the bladder and the airbag cushion are inflated at substantially the same time.

15. The method of claim 13, wherein the bladder is inflated before the airbag cushion.

16. The method of claim 13, wherein the airbag cushion is an inflatable curtain.

17. A method of deploying an airbag cushion comprising the steps of:
    temporarily bridging a void behind a trim panel covering one of a B pillar of the vehicle and a C pillar of a vehicle by inflating an inflatable airbag deployment guide in the void, wherein the inflatable airbag deployment guide is positioned on the airbag cushion such that it is in direct fluid communication with the fill chamber of the airbag cushion and receives inflation gas from the fill chamber of the airbag cushion; and
    inflating the airbag cushion, such that the inflatable airbag deployment guide promotes proper inflation of the airbag cushion.

18. The method of claim 17, wherein the inflatable airbag deployment guide is inflated and the airbag cushion is inflated at approximately the same time.

19. The method of claim 17, wherein the step of temporarily bridging a void comprises inflating an inflatable bladder in the void.

20. The method of claim 19, wherein the inflatable bladder is sized to block the void.

21. The method of claim 17, wherein the airbag cushion is an inflatable curtain.

* * * * *